(12) United States Patent
Yamamoto et al.

(10) Patent No.: US 6,700,865 B1
(45) Date of Patent: Mar. 2, 2004

(54) DIVERSITY RECEIVER

(75) Inventors: Takeshi Yamamoto, Tokyo (JP); Kazuhiro Okanoue, Tokyo (JP); Tomoki Osawa, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/536,143

(22) Filed: Mar. 28, 2000

(30) Foreign Application Priority Data

Mar. 29, 1999 (JP) .......................................... 11-085354

(51) Int. Cl.⁷ ................................................ H04B 7/02
(52) U.S. Cl. ...................................... 370/208; 370/203
(58) Field of Search ............................... 370/203, 204, 370/205, 206, 207, 208, 209, 211, 212, 213; 375/259, 260, 267, 316, 347, 346, 349; 455/269, 272, 277.1, 277.2, 278.1, 279.1

(56) References Cited

U.S. PATENT DOCUMENTS

| | | | | |
|---|---|---|---|---|
| 5,097,484 A | * | 3/1992 | Akaiwa | 375/40 |
| 5,446,922 A | * | 8/1995 | Siwiak | 455/277.2 |
| 5,561,673 A | * | 10/1996 | Takai | 455/277.2 |
| 6,085,076 A | * | 7/2000 | Lindsay | 455/277.1 |
| 6,181,749 B1 | * | 1/2001 | Urabe | 375/267 |
| 6,512,738 B1 | * | 1/2003 | Namekata | 370/210 |
| 6,563,858 B1 | * | 5/2003 | Fakatselis | 375/148 |

FOREIGN PATENT DOCUMENTS

| | | | |
|---|---|---|---|
| EP | 0620657 A1 | * 10/1994 | ............ H04B/7/08 |
| JP | 6-303220 A | 10/1994 | |
| JP | 8-79147 A | 3/1996 | |
| JP | 8-223143 A | 8/1996 | |
| JP | 9-307491 A | 11/1997 | |

* cited by examiner

Primary Examiner—Douglas Olms
Assistant Examiner—Ricardo M. Pizarro
(74) Attorney, Agent, or Firm—Sughrue Mion, PLLC (57) ABSTRACT

An object of the present invention is to provide a diversity receiver having an excellent anti-multi-path fading characteristic in a further simple structure. A diversity receiver according to the present invention measures a reception level, delay spread and a phase of a burst OFDM modulates signal received by a plurality of antennas. Received signals of arbitrary antennas are combined for synthesization and demodulated in accordance with a result of measurement, thereby obtaining the excellent anti-multi-path fading characteristic.

15 Claims, 7 Drawing Sheets

DIVERSITY RECEIVER

BACKGROUND OF THE INVENTION

1. Field of the Invention

The present invention relates to a diversity receiver for a burst OFDM modulated signal transmission system using orthogonal frequency domain multiplex (which will be referred to as OFDM hereunder), and more particularly to a diversity receiver superior in an anti-multi-path fading characteristic.

2. Description of Related Art

The orthogonal frequency domain multiplex modulation mode is a multi-carrier modulation mode using a plurality of sub-carriers. In the OFDM modulation mode, transmission data is divided and distributed in accordance with each sub-carrier to be transmitted. Since a plurality of sub-carriers are used to transmit data, there is no need to assure a wide band for each sub-carrier. This is advantageous in the anti-multi-path fading characteristic.

The further prevalence of the data transmission system using OFDM is expected in the field of mobile radio communication. Various kinds of personal digital assistance are proposed in the field of mobile ratio communication. A user is becoming capable of performing data communication even when the user is moving at high speed, and a need for improvement in the communication performance in the mobile communication. In addition, a receiver having the excellent anti-multi-path fading characteristic in a further simple structure is desired.

Figure 1:
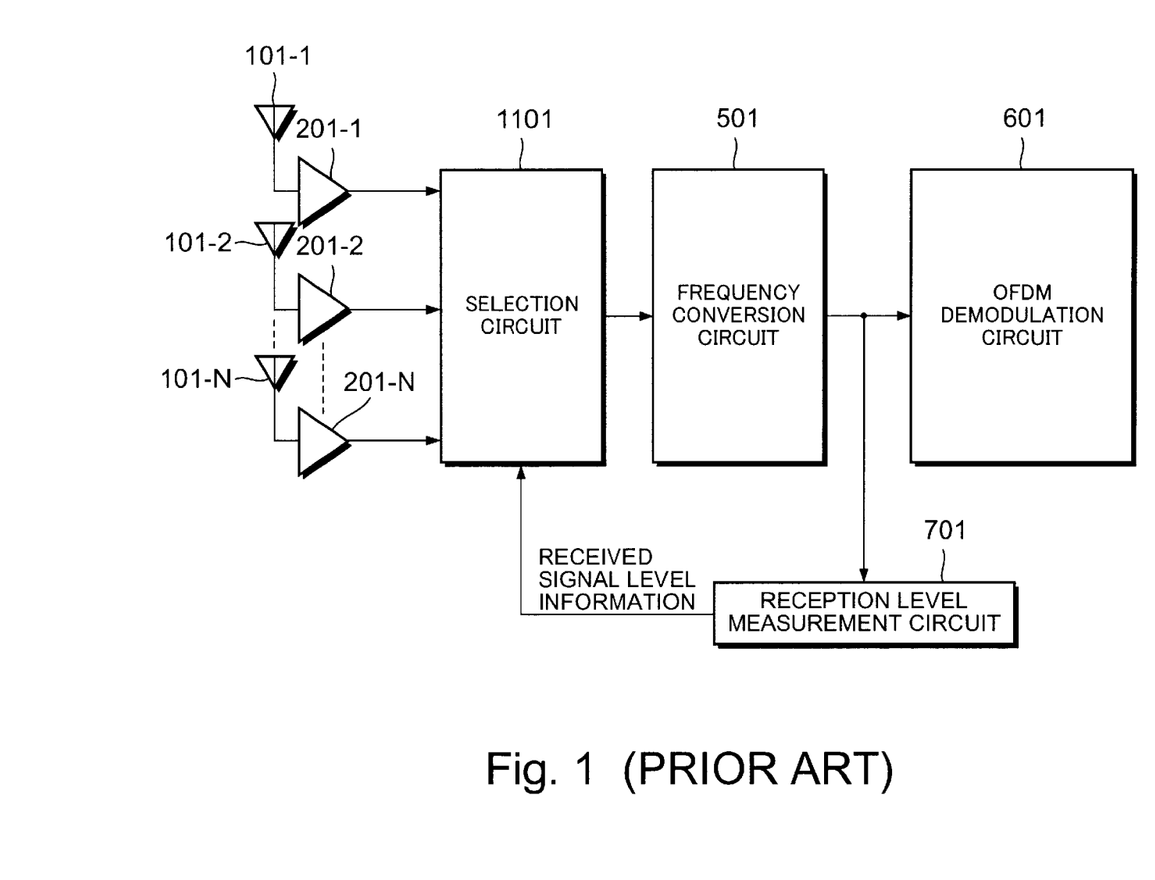
FIG. 1 is a block diagram of a prior art diversity receiver.

Conventionally, as an example of a receiver adopting the OFDM modulation mode superior in the anti-multi-path fading characteristic, a diversity receiver such as shown in FIG. 1 has been used. The illustrated diversity receiver has been conventionally known. This is a so-called an antenna selective diversity system.

An OFDM modulated signal received by this diversity receiver is intermittently transmitted. Each intermittently transmitted signal is referred to as an OFDM burst signal and has a fixed format.

Figure 2:
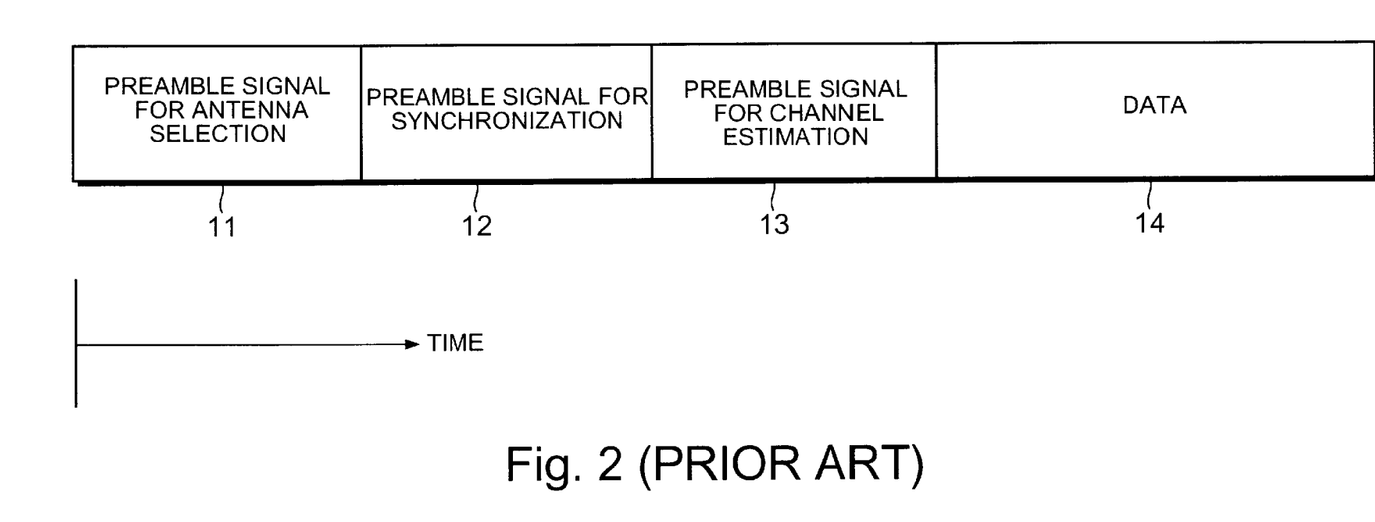
FIG. 2 is a structural drawing of an OFDM burst signal as a received signal of the diversity receiver illustrated in FIG. 1.

FIG. 2 shows a structure of the OFDM burst signal received by the diversity receiver depicted in FIG. 1.

Referring to FIG. 2, each OFDM burst signal is constituted by a preamble signal for antenna selection 11, a preamble signal for synchronization 12, a preamble signal for channel estimation 13, and data 14 in the mentioned order.

In FIG. 1, the OFDM modulated signals (RF signals) received by antennas 101-1 to 101-N are respectively amplified by low noise amplifiers 201-1 to 201-N and inputted to a selection circuit 1101. The selection circuit 1101 switches output signals from the low noise amplifiers 201-1 to 201-N to be sequentially selected. The output signals which are outputted from the low noise amplifiers 201-1 to 201-N and selected by the selection circuit 1101 are inputted to a frequency conversion circuit 501. The frequency conversion circuit 501 converts the output signal from the selection circuit 1101 to an IF frequency to be outputted therefrom. An OFDM demodulation circuit 601 demodulates an output signal from the frequency conversion circuit 501.

Meanwhile, the output signal from the frequency conversion circuit 501 is inputted to a reception level measurement circuit 701. The reception level measurement circuit 701 measures a level of the input signal and outputs received signal level information.

The selection circuit 1101 refers to the received signal level information outputted from the reception level measurement circuit 701 and selects an antenna whose reception level is maximum.

However, the above-described receiver adopting the OFDM modulation mode in the antenna selective diversity can not necessarily demonstrate the excellent anti-multi-path fading characteristic in the multi-path fading environment.

That is, in the multi-path fading environment, the reception level of a given sub-carrier may be lowered in some cases even if an antenna having the maximum reception level is selected. In such a case, data transmitted by using the sub-carrier having the lowered reception level can not be accurately demodulated, which may cause an error.

Accordingly, selection of an antenna having the maximum reception level can not be necessarily optimum.

SUMMARY OF THE INVENTION

It is therefore an object of the present invention to provide a diversity receiver which has a further simple structure and the excellent anti-multi-path fading characteristic.

To this end, a diversity receiver according to the present invention has a structure in which received signals of a plurality of antennas receiving burst OFDM modulated signals are selected to be synthesized.

Controlling means for selecting an antenna in accordance with the reception state of each antenna controls so as to synthesize received signals of all the antennas upon detecting the OFDM burst signal.

Further, another controlling means controls so as to turn on all ON/OFF switches of the antennas whose reception level exceeds a determined reception level to synthesize received signals upon detecting the OFDM burst signal.

Furthermore, still another controlling means measures channel delay spread of the received signal of each antenna upon detecting the OFDM burst signal and turn on all ON/OFF switches of the antennas whose delay spread is within a determined threshold value to synthesize a received signal.

Moreover, yet another controlling means measures a phase of the received signal of each antenna upon detecting the OFDM burst signal and turn on all ON/OFF switches of the antennas having the received signal with the same phase to be synthesized.

In addition, further controlling means controls so as to turn on power supplies of only low noise amplifiers of the antennas used for reception in order to reduce the consumption power.

BRIEF DESCRIPTION OF THE DRAWINGS

The above and other objects, features and advantages of the present invention will become more apparent from the following detailed description when taken in conjunction with the accompanying drawings wherein.

DETAILED DESCRIPTION OF THE PREFERRED EMBODIMENTS

First Embodiment

Figure 3:
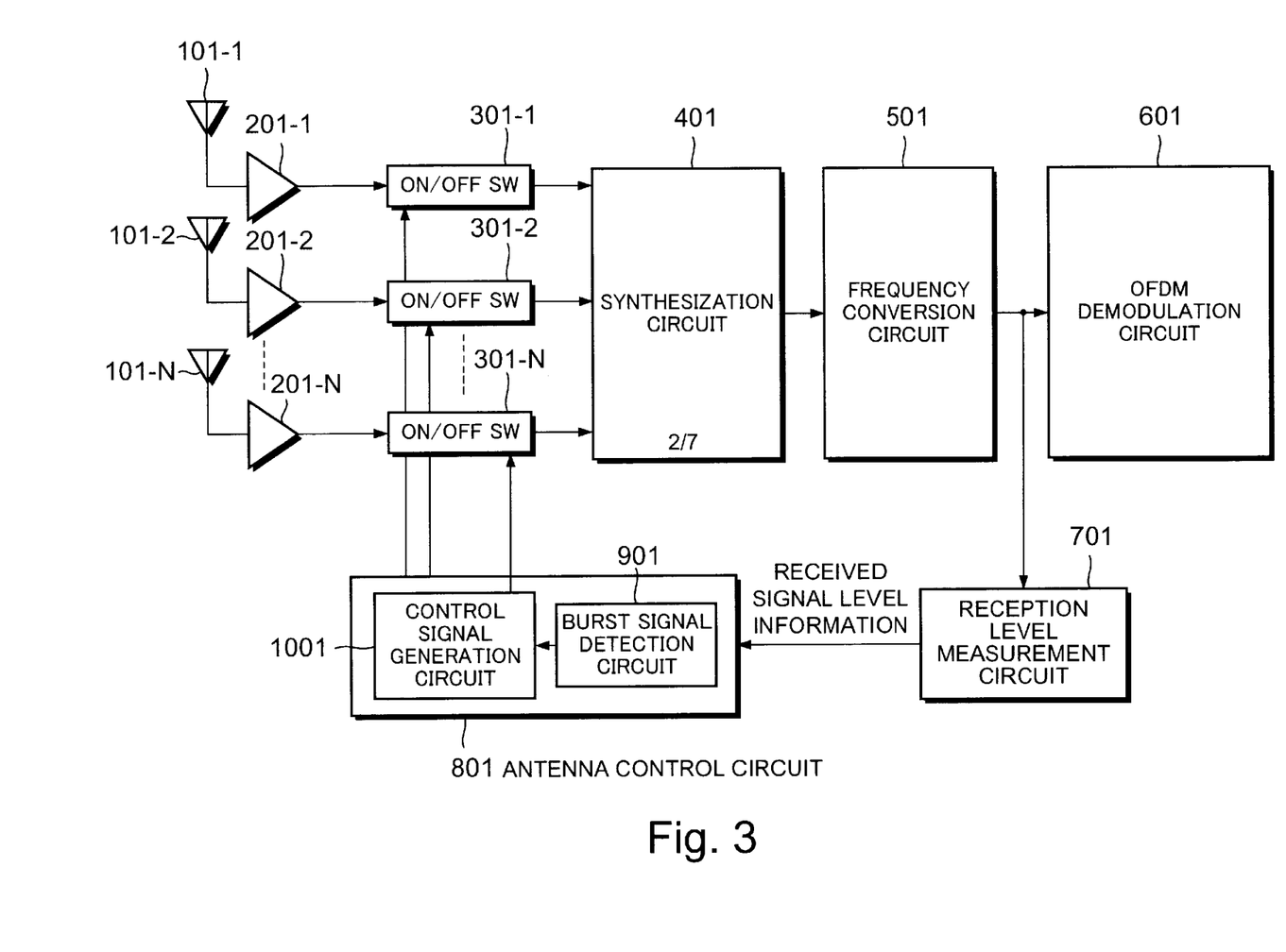
FIG. 3 is a block diagram showing a first embodiment of a diversity receiver according to the present invention.

FIG. 3 is a block diagram showing a structure of a diversity receiver according to a first embodiment of the present invention.

In FIG. 3, N antennas 101-1 to 101-N receive OFDM modulated signals transmitted from a transmitter. The OFDM burst signals received by the respective antennas are amplified by low noise amplifiers 201-1 to 201-N.

ON/OFF switches 301-1 to 301-N are respectively provided at rear stages of the low noise amplifiers 201-1 to 201-N and causes output signals from the low noise amplifiers 201-1 to 201-N to become intermittent in accordance with a control signal from an antenna control circuit 801.

An synthesization circuit 401 synthesizes output signals from the ON/OFF switches 301-1 to 301-N.

A frequency conversion circuit 501 converts an output signal from the synthesization circuit 401 into a signal for an IF frequency band.

An OFDM demodulation circuit 601 demodulates the IF frequency signal outputted from the frequency conversion circuit 501.

A reception level measurement circuit 701 receives the IF frequency signal outputted from the frequency conversion circuit 501 to measure a signal level thereof and outputs received signal level information to the antenna control circuit 801.

The antenna control circuit 801 is constituted by a burst signal detection circuit 901 and a control signal generation circuit 1001. The burst signal detection circuit 901 compares a predetermined threshold value with the received signal level information of the reception level measurement circuit 701 and detects a bust signal.

The control signal generation circuit 1001 sequentially changes over the ON/OFF switches until the burst signal detection circuit 901 detects the burst signal. The reception level measurement circuit 701 individually measures levels of the received signals from the antennas 101-1 to 101-N, and the burst signal detection circuit 901 detects the burst signal. When the burst signal detection circuit 901 detects the burst signal, the control signal generation circuit 1001 controls so as to turn on all the ON/OFF switches 301-1 to 301-N.

The above-described diversity receiver according to the present invention synthesizes the received signals from other antennas and averages the reception levels of the respective sub-carriers even though a level of a specific sub-carrier received by a given antenna is lowered due to the multi-path fading and an error is thereby generated in the demodulated data.

This can compensate the reduction in the level of the specific sub-carrier received by a given antenna and prevent an error in the demodulated data from occurring. In this manner, the anti-multi-path fading characteristic can be improved.

Additionally, in the diversity receiver illustrated in FIG. 3, after the burst signal detection circuit 901 detects the burst signal, the control signal generation circuit 1001 may sequentially change over the reception antennas by controlling the ON/OFF switches 301-1 to 301-N and the reception level measurement circuit 701 may measure the reception levels of the respective antennas. In this case, the control signal generation circuit 1001 refers to a result of measurement by the reception level measurement circuit 701 and controls so as to turn on all the ON/OFF switches of the antennas whose reception level exceeds the predetermined threshold value in the ON/OFF switches 301-1 to 301-N.

By doing so, the received signals of the antennas having the excellent reception state can be synthesized to improve the anti-multi-path fading characteristic.

Second Embodiment

Figure 4:
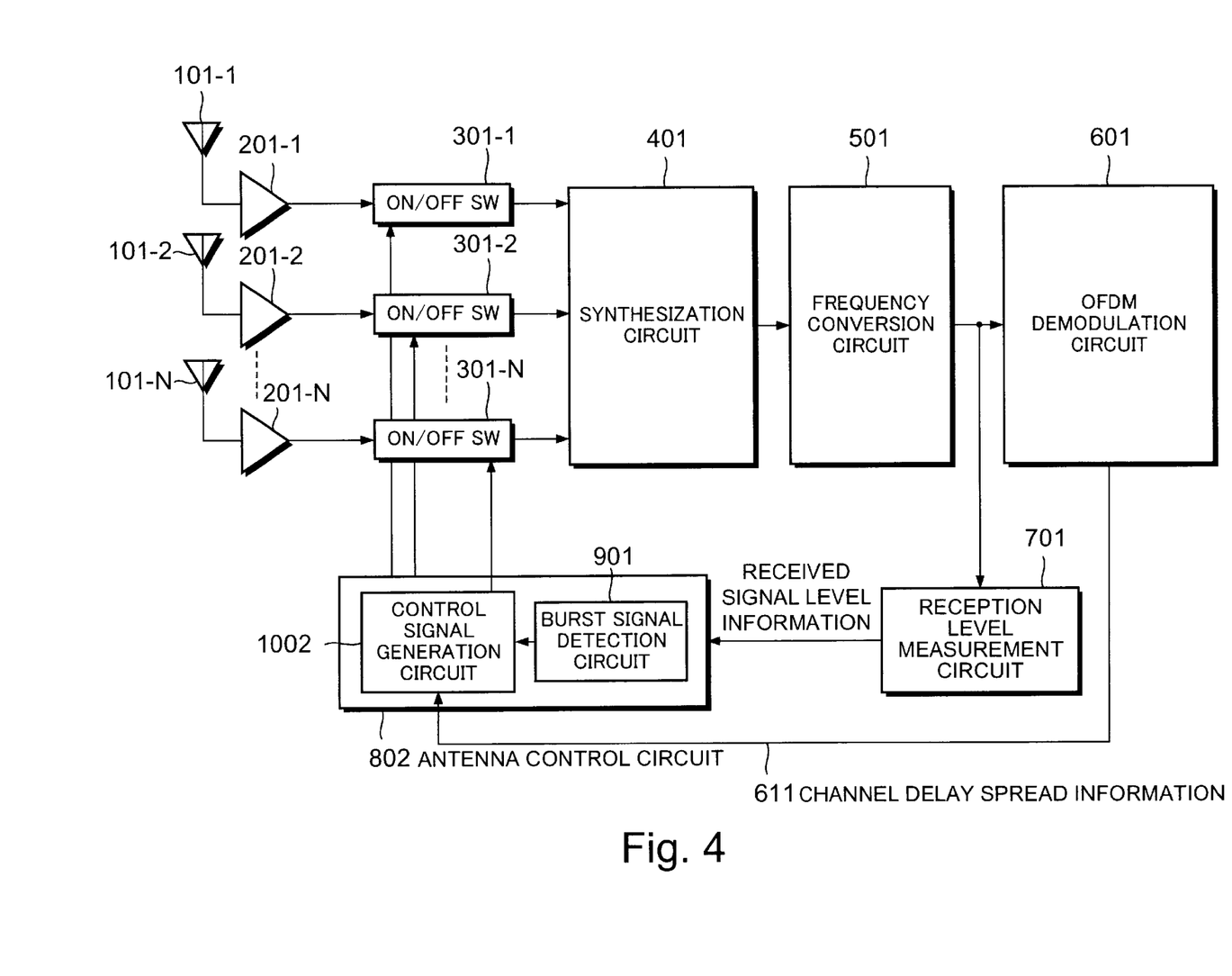
FIG. 4 is a block diagram showing a second embodiment of a diversity receiver according to the present invention.

FIG. 4 is a block diagram of a diversity receiver according to a second embodiment of the present invention.

In the drawing, a difference from FIG. 3 lies in that channel delay spread information 611 is inputted from the OFDM demodulation circuit 601 to the control signal generation circuit 1002 of the antenna control circuit 802.

The control signal generating means 1002 sequentially changes over the ON/OFF switches until the burst signal is detected by the burst signal detection circuit 901. The reception level measurement circuit 701 individually measures levels of the received signals from the antennas 101-1 to 101-N, and the burst signal detection circuit 901 detects the burst signal.

When the burst signal detection circuit 901 detects the burst signal, the control signal generation circuit 1002 sequentially changes over the respective antennas and measures the delay spread of the received signals from the respective selected antennas in the OFDM demodulation circuit 601.

Figure 5:
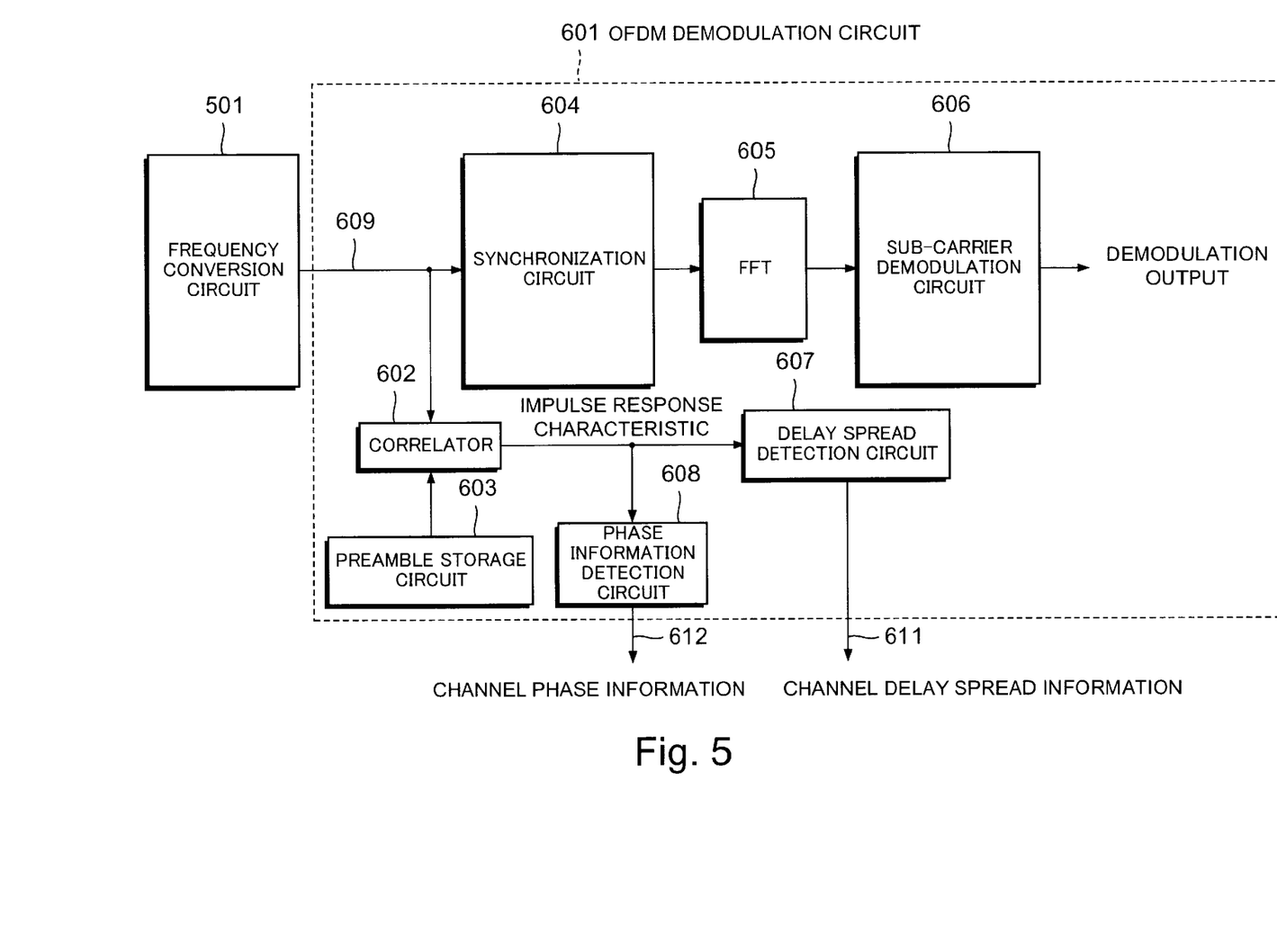
FIG. 5 is a block diagram of an OFDM demodulation circuit 601 illustrated in FIG. 4.

Here, the structure of the OFDM demodulation circuit 601 will be concretely described.

FIG. 5 is a block diagram showing the structure of the OFDM demodulation circuit 601.

In FIG. 5, a synchronization circuit 604 inputs a digital complex baseband signal 609 which has been sample-quantized by an A/D converter (not shown) for digitizing an output signal from the frequency conversion circuit 501 and detects a preamble signal for synchronization 12 to synchronize.

A Fourier conversion circuit (FFT) 605 subjects an output signal from the synchronization circuit 604 to Fourier conversion and separates the OFDM modulated signal into signals for the respective sub-carriers to be outputted.

A sub-carrier demodulation circuit 606 receives an output signal from the FFT 605 and demodulates the received signal in accordance with each sub-carrier.

A correlator 602 establishes correlation between an output signal from a preamble storage circuit 603 previously storing a signal pattern of a preamble signal for antenna selection 11 and the digital complex baseband signal 609 and outputs impulse response characteristic information. The impulse response characteristic information represents a channel impulse response characteristic of the channel in the digital form.

A delay spread detection circuit 607 detects channel delay spread from the impulse response characteristic information outputted from the correlator 602 and outputs the channel delay spread information 611 to the antenna control circuit 802.

Again referring to FIG. 4, the control signal generating means 1002 refers to the channel delay spread information 611 from the delay spread detection circuit 607 and controls the ON/OFF switches 301-1 to 301-N so as to turn on all ON/OFF switches of the antennas which receives a delay spread signal smaller than the predetermined threshold value.

Since only the received signals from the antennas which receive the delay spread signal smaller than the predetermined threshold value are inputted to the synthesization circuit 401 where these signals are synthesized, the anti-multi-path fading characteristic can be improved without increasing the interference between codes.

Third Embodiment

Figure 6:
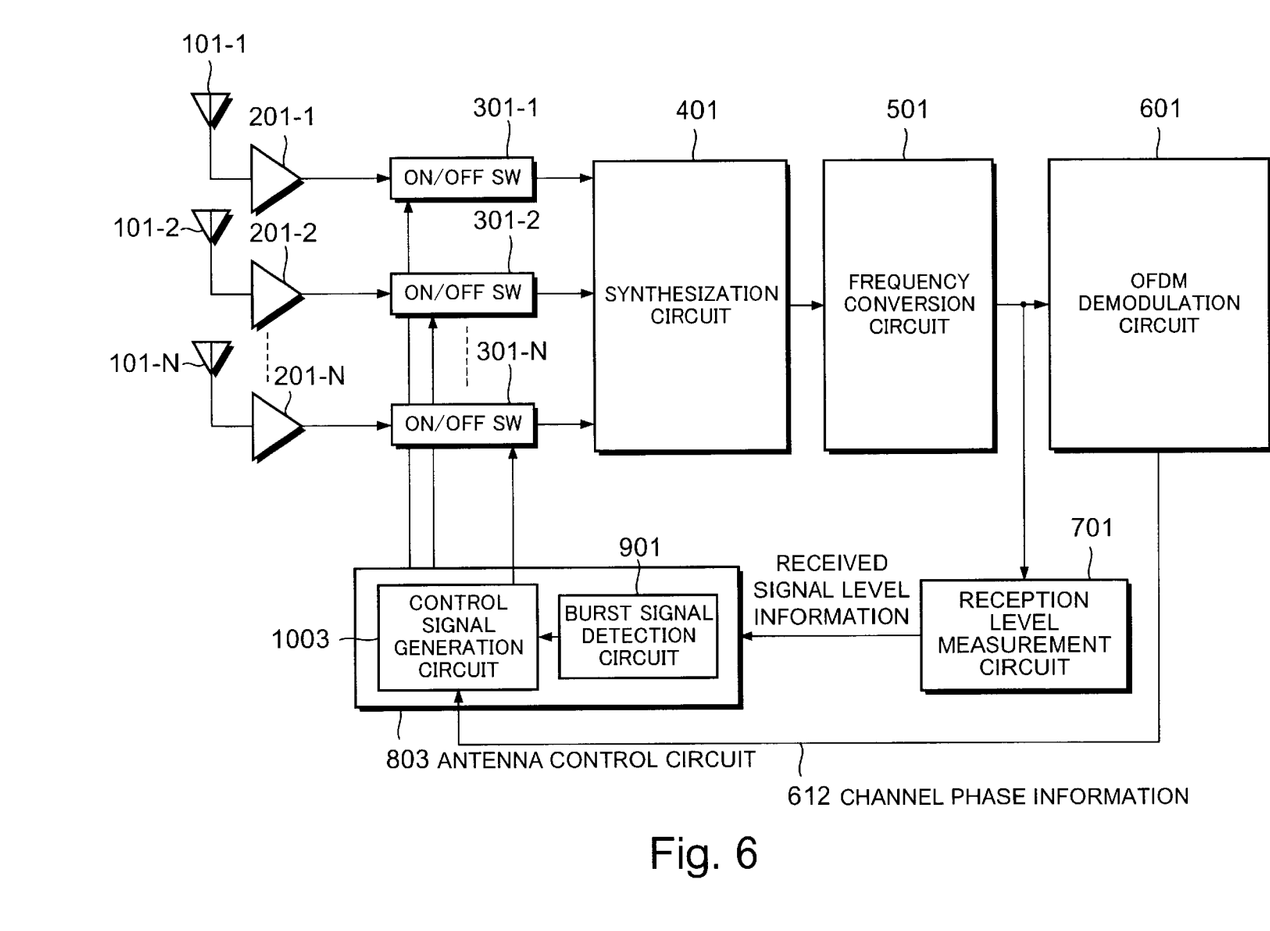
FIG. 6 is a block diagram showing a third embodiment of a diversity receiver according to the present invention.

FIG. 6 is a block diagram of a diversity receiver according to a third embodiment of the present invention.

In the drawing, a difference from FIG. 3 lies in that the channel impulse response characteristic information 612 is inputted from the OFDM demodulation circuit 601 to the control signal generation circuit 1003 of the antenna control circuit 803.

The control signal generating means 1003 sequentially changes over the ON/OFF switches until the burst signal detection circuit 901 detects the burst signal; the reception level measurement circuit 701 individually measures levels of the received signals from the antennas 101-1 to 101-N; and the burst signal detection circuit 901 detects the burst signal.

When the burst signal detection circuit 901 detects the burst signal, the control signal generation circuit 1002 sequentially changes over the respective antennas and measures the phase of the received signal from each selected antenna in the OFDM demodulation circuit 601.

Here, again referring to FIG. 5, the operation of the OFDM demodulation circuit 601 in this example will be concretely explained.

In FIG. 5, a phase information detection circuit 608 detects a phase of the received signal output from the correlator 602 and outputs channel phase information 612 to the antenna control circuit 803.

Again referring to FIG. 6, the control signal generating means 1003 refers to the channel phase information 612 from the phase information detection circuit 608 and controls the ON/OFF switches 301-1 to 301-N in such a manner that the antennas having the received signal in phase are combined.

To the synthesization circuit 401 are inputted signals from the antennas having the received signals in phase and these signals are synthesized.

This can enhance the level of the output signal from the synthesizing circuit 401 and improve the anti-multi-path fading characteristic.

Further, it is needless to say that the control signal generating means 1003 can be designed so as to refer to both the channel phase information 612 from the phase information detection circuit 608 and the channel delay spread information 611 outputted from the delay spread detection circuit 607.

In this case, if a reception antenna having the delay spread within the predetermined threshold value is selected, an antenna for receiving, e.g., a signal with the anti-phase can be eliminated from the antenna having the small delay spread when the control signal generating means 1003 also refers to the channel phase information 612 of the received signal of each antenna, and the anti-multi-path fading characteristic can be further improved.

Fourth Embodiment

Figure 7:
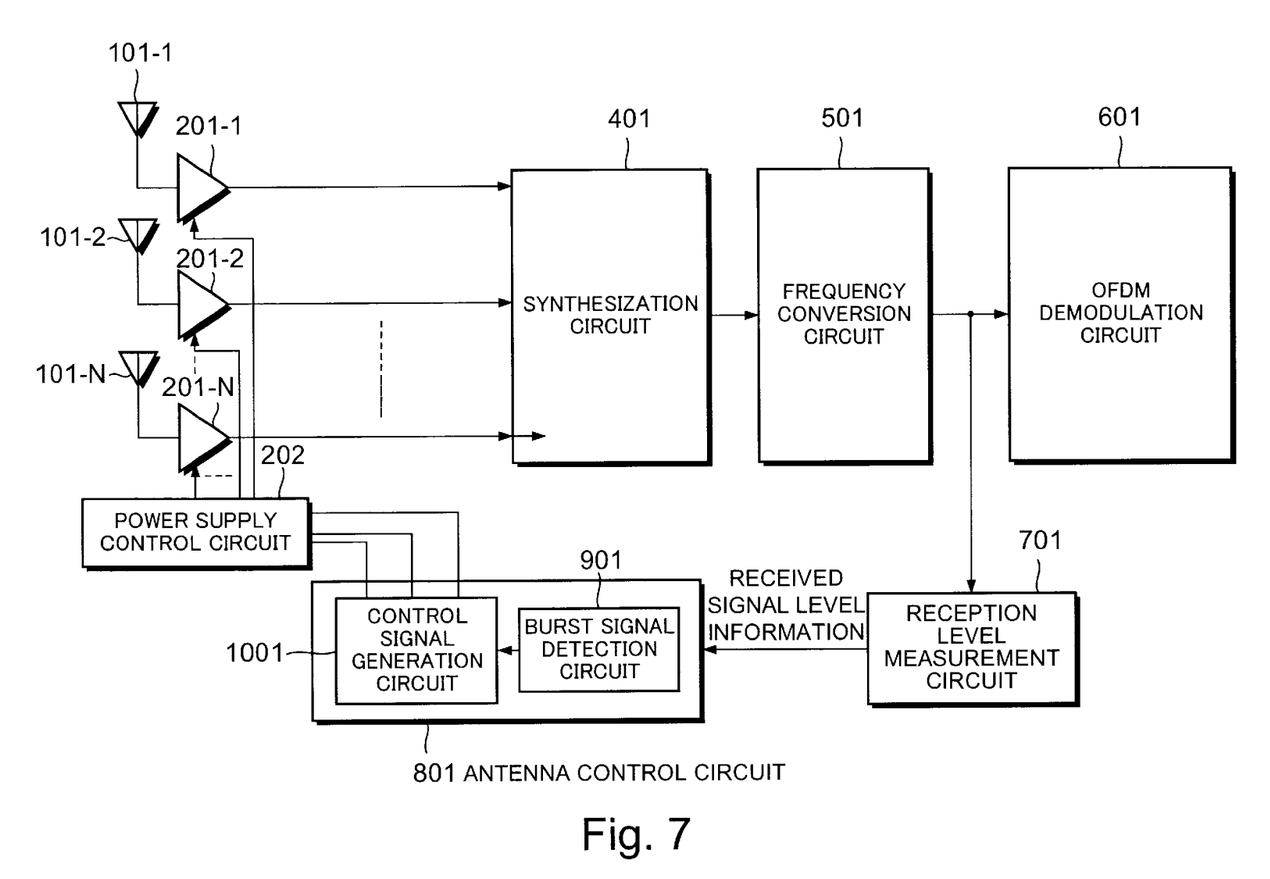
FIG. 7 a block diagram showing a fourth embodiment of a diversity receiver according to the present invention.

FIG. 7 is a block diagram of a diversity receiver according to a fourth embodiment of the present invention.

In the drawing, a difference from FIG. 3 lies in that the antenna control circuit 801 controls to turn on/off the low noise amplifiers 201-1 to 201-N in place of controlling the ON/OFF switches 301-1 to 301-N.

That is, the power supply control circuit 202 controls to turn on/off the power supply of the respective low noise amplifiers 201-1 to 201-N upon receiving an output signal from the control signal generation circuit 1001.

With this operation, only one low noise amplifier can consume the power until the burst signal is detected, thereby reducing the consumption power of the receiver.

This embodiment can be similarly applied to the second and third embodiments as well as the first embodiment, each of which can have the effect for reducing the consumption power.

When this embodiment is applied to the second and third embodiments, it is needless to say that consumption power can be further reduced by appropriately turning on/off the power supply of the low noise amplifier of the non-selected antenna not only in the received signal waiting mode but also after detection of the burst signal.

As described above, even if a level of a specific sub-carrier of the received signal of a given antenna is lowered due to the multi-path fading to cause an error in the demodulated data, the levels of the respective sub-carriers can be averaged and an error rate characteristic can be improved in the multi-path environment when the diversity receiver according to the present invention appropriately selects and synthesizes the received signals from other antennas.

Further, when the diversity receiver according to the present invention operates so as to select the received signal from any one antenna until the burst signal is detected, the consumption power in the reception standby mode can be suppressed as similar to a receiver having no diversity processing.

While this invention has been described in connection with certain preferred embodiments, it is to be understood that the subject matter encompassed by way of this invention is not to be limited to those specific embodiments.

On the contrary, it is intended for the subject matter of the invention to include all alternative, modification and equivalents as can be included within the spirit and scope of the following claims.

What is claimed is:

1. A diversity receiver for use in a burst OFDM modulated signal transmission system, comprising:

a plurality of antennas for receiving burst OFDM modulated signals;

a plurality of amplifiers for respectively amplifying output signals from said antennas;

a plurality of switches for respectively turning on/off output signals from said plurality of amplifiers;

a synthesizer for synthesizing output signals from said plurality of switches;

an output level detector for detecting an output level of said synthesizer;

an antenna control circuit which sequentially turns on said switches one by one based on an output from said detector or controls so as to turn on said switches in accordance with a predetermined number of outputs; and a demodulator for demodulating said burst OFDM modulated signal based on an output from said detector.

2. A diversity receiver according to claim 1, wherein said antenna control circuit comprises: a burst signal detector for comparing an output from said output level detector with a first threshold value to detect said burst OFDM modulated signal; and a control signal generation circuit which sequentially turns on said switches one by one before detecting said burst OFDM modulation signal and controls so as to turn on said all switches after detecting said burst OFDM modulated signal.

3. A diversity receiver according to claim 1, wherein said antenna control circuit comprises: a burst signal detector for comparing an output from said output level detector with a first threshold value to detect said burst OFDM modulated signal; and a control signal generation circuit which measures each output level of said plurality of amplifiers after detecting said burst OFDM modulated signal and controls said switches so as to input to said synthesizer an output signal from said amplifier having an output level higher than a second threshold value.

4. A diversity receiver according to claim 1, wherein said antenna control circuit comprises: a burst signal detector for comparing an output from said output level detector with a first threshold value to detect said burst OFDM modulated signal; and a control signal generation circuit which sequentially turns on said switches one by one before detecting said burst OFDM modulated signal, measures delay spread of each output from said plurality of amplifiers after detecting said burst OFDM modulated signal and controls said switches so as to input to said synthesizer an output signal of each one of said plurality of amplifiers having said delay spread smaller than a second threshold value in said plurality of amplifiers.

5. A diversity receiver according to claim 4, wherein said delay spread is derived based on channel delay spread obtained by said demodulator.

6. A diversity receiver according to claim 5, wherein said demodulator detects said channel delay spread based on correlation between an input signal and a previously stored preamble pattern of said burst OFDM modulated signal.

7. A diversity receiver according to claim 1, wherein said antenna control circuit comprises: a burst signal detector for comparing an output from said output level detector with a first threshold value to detect said burst OFDM modulated signal; and a control signal generation circuit which sequentially turns on said switches one by one before detecting said burst OFDM modulated signal, measures channel phase information of each output signal from said plurality of amplifiers after detecting said burst OFDM modulated signal and controls said switches so as to input an output signal from each one of said plurality of amplifiers in phase to said synthesizer.

8. A diversity receiver according to claim 7, wherein said channel phase information is derived based on wherein a plurality of said switches turn on or off power an impulse response characteristic obtained by said demodulator.

9. A diversity receiver according to claim 8, wherein said demodulator detects said channel phase information based on correlation between an input signal and a previously stored preamble pattern of said burst OFDM modulated signal.

10. A diversity receiver according to claim 1, wherein said plurality of switches turn on or off power supplies of said plurality of amplifiers.

11. A diversity receiver according to claim 2, wherein said plurality of switches turn on or off power supplies of said plurality of amplifiers.

12. A diversity receiver according to claim 3, wherein said plurality of switches turn on or off power supplies of said plurality of amplifiers.

13. A diversity receiver according to claim 4, wherein said plurality of switches turn on or off power supplies of said plurality of amplifiers.

14. A diversity receiver according to claim 7, wherein said plurality of switches turn on or off power supplies of said plurality of amplifiers.

15. A diversity receiver according to claim 1, wherein said burst OFDM modulated signal has a preamble signal for antenna selection, a preamble signal for synchronization and a preamble signal for channel estimation at the forefront of data.

* * * * *